(No Model.)
F. ECAUBERT.
DEVICE FOR MAKING AND ORNAMENTING WATCH CENTERS.
No. 270,644. Patented Jan. 16, 1883.
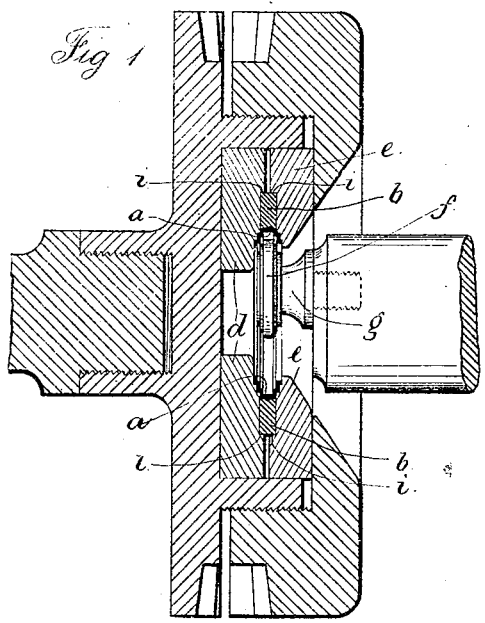
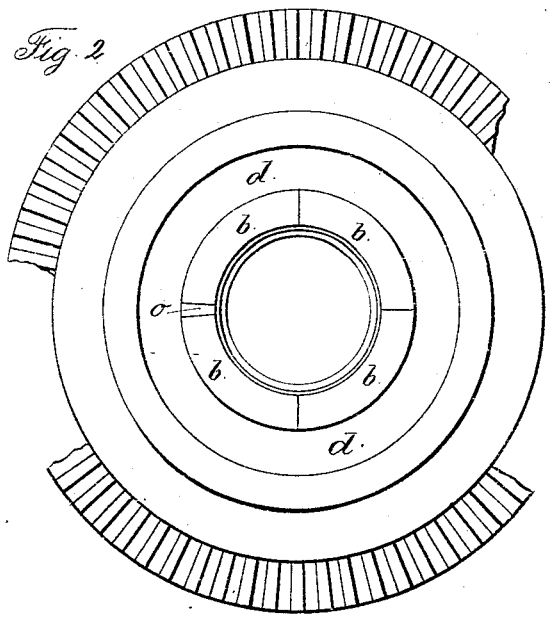
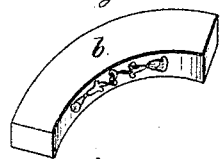
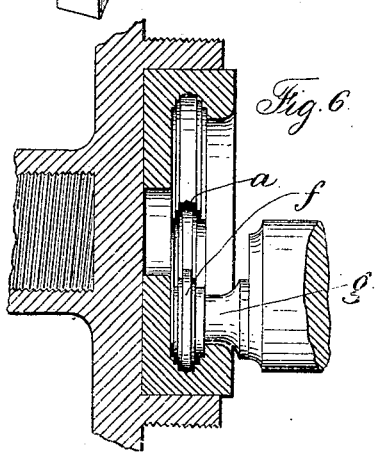
Witnesses:
J. Stark
Chas. H. Smith
Inventor
Frederic Ecaubert
per Lemuel W. Serrell
atty
N. PETERS, Photo-Lithographer, Washington, D. C.

UNITED STATES PATENT OFFICE.

FREDERIC ECAUBERT, OF NEW YORK, N. Y.

DEVICE FOR MAKING AND ORNAMENTING WATCH-CENTERS.

SPECIFICATION forming part of Letters Patent No. 270,644, dated January 16, 1883.

Application filed August 21, 1882. (No model.)

*To all whom it may concern:*

Be it known that I, FREDERIC ECAUBERT, of the city and State of New York, have invented an Improvement in the Manufacture of Embossed Metallic Rings, of which the following is a specification.

This improvement is made especially for manufacturing watch-case centers with ornamental designs—such as vines, flowers, &c.—raised on the surface; but the same may be employed in the manufacture of bracelets and other ring-shaped articles in sheet metal.

In Letters Patent, No. 253,355, granted to me there is a two-part die of circular form, and means for clamping, holding, and revolving the die, and for applying to the sheet-metal ring a roller that extends the sheet metal, and other rollers that form the offsets or snaps for the case-lids and bezels. When I am making watch-case centers the devices in the aforesaid patent, or many of them, become available with the present improvements, and a reference is hereby made to said patent for a description of such devices.

My present improvements are represented in the accompanying drawings, wherein Figure 1 is a vertical section of the die and die-holder. Fig. 2 is a face view of the die and holder. Fig. 3 is a perspective view of one of the die-blocks; and Fig. 4 is an edge view, and Fig. 5 a section, of the embossed sheet-metal ring in larger size; and Fig. 6 is a section of the first shaping-die.

The article to be produced being a ring, *a*, Figs. 4 and 5, with figures around its periphery raised or embossed, it will be apparent that if the die in which the ring is formed were a complete circle the sheet-metal ring could not be removed, in consequence of the embossed surfaces being of superior diameter, and that if the die were separated on the line of a plane passing at right angles to the axis of the ring, as in aforesaid patent, there would be a mark upon the ring where the separation takes place, and some parts of the raised figures would still be confined by the ring-dies and not be separable therefrom.

In order to remove the embossed sheet-metal ring from the ring-shaped steel embossing-die, I make such die in two or more parts, *b b*. I have shown four such parts, and I support the parts of the die between and within circular recesses in the clamps *d* and *e*, as shown.

When adapted to watch-case centers the circular clamps *d e* are provided with offsets to form the shoulders or snaps over which the watch-case lid or the bezel passes, as set forth in my aforesaid patent, and the clamps *d e* are made with shoulders at *i i*, against which rest the external edges of the segmental die *b b*, and the circular clamps *d e* are confined by any suitable means, preferably a chuck or screw-ring at the end of a mandrel that is rotated by competent power.

The ring of sheet metal is to be stamped up by dies or shaped by any suitable apparatus—such as hereinafter described—so that it will fit closely into the circular dies *b b*, as said dies are held within the recess of the clamp *d* or *e*. The parts are then firmly clamped and held between *d e*, and the dies and the sheet-metal ring are revolved, and a roller, *f*, upon an axis, *g*, is brought against the interior surface of the ring *a* to expand the same against the interior surface of the dies *b b*, so that the same may press upon the interior surface with sufficient force and friction to prevent the ring *a* slipping under the operation of the roller *f*, and as the pressure by the roller *f* continues the metal is displaced from the inside of the ring. Such ring is rolled thinner and the metal forced into the ornamental recesses in the surfaces of the die-sections *b* so as to fill them, and thus form upon the ring the embossed counterpart of the engraved dies *b b*. This operation is very rapidly performed, and the work is very perfect. The die is then loosened and taken apart, the sections *b b* separating easily from each other and from the embossed surface of the sheet-metal ring *a*. Another ring-blank is now introduced and the operation repeated. If desired, a key may be introduced, as at *o*, to wedge the die-sections *b b* firmly together as they are retained within the circular recesses of the clamps *d* or *e*.

The ring-blank of sheet metal should be in a soft or annealed condition when placed within the engraved embossing-die, and the parts should be clean and polished, in order that the embossed ring may need but little finishing when it is taken out of the divided ring-die.

If the pattern is to be recessed in the watch-case center, the figures on the dies will be raised and such recessed design on the watch-case center may be filled with enamel.

If desired, the divided embossing-die may be held within a hollow chuck by any suitable clamp, so as to be kept in place while in use.

In many instances it is advisable to shape up the sheet-metal ring before placing it in the embossing-die. For this purpose I employ a hollow die having the shoulders or offsets corresponding, or nearly so, to those of watch-case and the finishing-die; but this die is considerably larger in diameter than the watch-case center, as seen in Fig. 6, so that the sheet-metal ring can be placed in or taken out of the die, Fig. 6, without opening the die. The roller $f$ in that instance serves to shape up the ring and roll the same within the die until nearly as large as the embossing-dies $b$. It is then removed from the die, Fig. 6, and annealed, after which it is placed in the dies $b$ and embossed.

In my aforesaid patent the knurled edge is embossed by the pressing of the metal into the grooves or recesses of the die. The same thing is done in my present invention; but with the knurled work the die can be taken off if divided in a line at right angles to the axis of the ring.

To remove the die from the ring or other article, where the embossed ornaments are in the form of vines, leaves, flowers, or designs other than the knurled work, the internal dies have to be in two or more segments separated in line of planes passing through the axis of the ring or other article, or nearly so.

I have found that the roller does not always turn when the metal ring that is being operated upon is lubricated, and hence that a burnisher acts in the same manner as and is the equivalent of the roller.

I claim as my invention—

1. A hollow embossing-die having the pattern upon or in its internal surface and separated into two or more sections, so as to be capable of removal from the embossed article, in combination with a clamp for supporting and holding such embossing-die and a roller for pressing the metal against the embossing-die, substantially as set forth.

2. The combination, with the clamps and roller $f$, of a ring-shaped embossing-die having the pattern in its inner surface and divided into two or more parts, so as to be capable of separation from the embossed ring, and the recessed clamps for receiving and holding together the parts of the ring-die, substantially as set forth.

3. For the manufacture of watch-case centers and other sheet-metal rings, the combination, with the roller acting within the sheet-metal ring, of a hollow die corresponding sectionally to the exterior of the ring, but of a larger diameter, so that the watch-case center can be inserted or withdrawn, as set forth.

Signed by me this 18th day of August, A. D. 1882.

F. ECAUBERT.

Witnesses:
GEO. T. PINCKNEY,
CHAS. H. SMITH.